United States Patent [19]

Rutsch et al.

[11] 4,298,556
[45] Nov. 3, 1981

[54] METHOD FOR MATCHED DIE MOLDING A FIBER REINFORCED POLYURETHANE FOAM MOLDED PRODUCT

[75] Inventors: Peter W. Rutsch, Absteinach; Michael Brehm, Weinheim an der Bergstrasse, both of Fed. Rep. of Germany

[73] Assignee: Firma Carl Freudenberg, Weinheim/an der Bergstrasse, Fed. Rep. of Germany

[21] Appl. No.: 92,187

[22] Filed: Dec. 13, 1979

[30] Foreign Application Priority Data

Dec. 16, 1978 [DE] Fed. Rep. of Germany ....... 2854544

[51] Int. Cl.³ .............................................. B29D 27/04
[52] U.S. Cl. ................................... 264/46.6; 264/46.7; 264/53; 264/257; 521/130
[58] Field of Search ........................ 264/46.6, 46.4, 54, 264/46.7, 53, 257; 521/130

[56] References Cited

U.S. PATENT DOCUMENTS

| | | | |
|---|---|---|---|
| 2,639,252 | 5/1953 | Simon et al. | 264/45.3 X |
| 2,855,021 | 10/1958 | Hoppe | 264/45.3 X |
| 3,095,386 | 6/1963 | Hudson | 521/130 X |
| 3,546,060 | 12/1970 | Hoppe et al. | 264/45.3 X |
| 3,746,665 | 7/1973 | Koleske et al. | 521/130 X |
| 3,895,159 | 7/1975 | Yoshimura | 264/45.3 X |
| 4,096,303 | 6/1978 | Doerfling | 264/45.6 X |
| 4,119,583 | 10/1978 | Filip et al. | 264/46.6 X |
| 4,130,614 | 12/1978 | Saidla | 264/45.3 X |
| 4,130,698 | 12/1978 | Sparrow et al. | 521/130 |
| 4,148,854 | 4/1979 | Cordts et al. | 264/45.3 |
| 4,169,922 | 10/1979 | Brown et al. | 521/130 X |

FOREIGN PATENT DOCUMENTS

205456 1/1957 Australia ............................. 521/130

OTHER PUBLICATIONS

"The Condensed Chemical Dictionary," Eighth Edition, revised by Gessner G. Hawley, New York, van Nostrand Reinhold, c1971, pp. 350,518,519,770,825.

*Primary Examiner*—Philip Anderson
*Attorney, Agent, or Firm*—Kenyon & Kenyon

[57] ABSTRACT

A fiber reinforcement is positioned on the female part of a matched die, and a reactive foaming mixture of polyol and isocyanate is placed on the reinforcement, the male part of the die set being then closed on the female part so as to compress the reinforcement and holding the die parts together while the mixture's foaming reaction occurs. So that the reinforcement can comprise finer than usual individual fiber thicknesses and be compressed more than usual by closing of the die while still filling all the voids between the fibers of the reinforcement with the foam produced by the mixture's reaction, from 5 to 30% by weight of a neutral ester having a boiling temperature higher than the foaming reaction temperature of the mixture, is initially added to the mixture before it is placed on the reinforcement and prior to closing of the die. This results in the foaming penetrating the voids between the fibers throughout the reinforcement between the mold parts more completely than is possible without using the ester.

4 Claims, 3 Drawing Figures

METHOD FOR MATCHED DIE MOLDING A FIBER REINFORCED POLYURETHANE FOAM MOLDED PRODUCT

BACKGROUND OF THE INVENTION

Matched die mold, using wet molding composites, has been used to produce fiber-reinforced polyurethane foam molded products, such as trunk hoods and auto-body parts, seating, helmets, luggage, etc.

This is done by using a matched die having female and male parts which when closed form a mold cavity of the desired contour. With the mold parts opened, a fiber reinforcement, either mat or a preform, is placed on or in the die cavity and a reactive foaming mixture, consisting essentially of polyol and isocyanate, is poured on the reinforcement in a quantity calculated to fill the voids between the reinforcement fibers and the mold cavity completely when the foaming reaction is completed. Closing of the mold compresses the fibrous structure of the reinforcement.

For a molded part of high density and, therefore, strength, it is desirable to use a reinforcement having fine fiber thicknesses and an initial uncompacted thickness proportioned so that when the mold is closed, the reinforcement is very substantially compacted. Normally the initial mixture includes additives such as a catalyst, propellant and possibly other additives.

Such matched die molding of fiber reinforced polyurethane foam molded products has involved the problem that with the dies closed and the reinforcement compacted, the foaming material has been unable to travel or flow through the interstices between the fibers of the reinforcement adequately to insure a good product. To overcome this problem, the prior art has used fiber-reinforcement having coarse fibers which are thicker than is desirable from the strength viewpoint of the ultimate product. The degree of compression of the reinforcement by closing of the die has heretofore necessarily been limited.

The above indicated problem results from the rapid increase in viscosity occurring during the chemical reaction producing the polyurethane foam, preventing flow through the fiber reinforcement unless the latter is designed to have an adequately low flow resistance to the foaming reaction product. With a reinforcing of more desirable fiber thickness and compaction, foam flow distances of only a few centimeters have been experienced, whereas products in the area of more than 2 m in extent form a desirable class of end products. The use of a plurality of sprues or runners to carry the reactive mixture into the mold cavity at an adequately large number of locations loses the advantages of simplicity and low product production costs, of which the matched die molding technique is inherently capable. The use of a molding mixture comprising components which react very slowly with each other, hopefully to effect complete reinforcement penetration with time, prolongs the product manufacturing time so long as to be economically undesirable.

For example, using the polyurethane foam production mixture mentioned earlier, and using a fiber reinforcement which although having undesirably low ultimate product strength characteristics does provide adequate flow of the foaming for products having a size of about 1600 mm, a setting and mold dwell time in the order of four to five minutes is possible. It is undesirable to lengthen this characteristic time period.

The object of the present invention has been to improve on the described molding technique so that relatively large molded products can be produced having a high density and, therefore, strength, and reinforced by fibrous reinforcements comprising fibers of a thinner thickness and compacted to a greater degree to provide the desirable high density, than was previously possible.

SUMMARY OF THE INVENTION

According to this invention, the described reactive foaming mixture of polyol and isocyanate, normally although not necessarily including the usual amounts of catalysts and/or propellant, is initially mixed with possibly from 5 to 30% by weight of a neutral ester having a boiling temperature higher than that of the foaming reaction temperature of the mixture per se. Preferably this weight percentage range is from 10 to 20% by weight of the reaction mixture and the ester has a boiling temperature above 200° C. with the usually used reaction mixture.

The use of the ester provides the foaming reaction product with the capacity to flow through and thoroughly wet the finer fibers of the more highly compacted fiber reinforcement such as is desirable to produce an ultimate product of higher than usual density and strength. Using fiberglass reinforcement having a fiber thickness of 20 microns and an area weight of 600 g/m$^2$ and molded under closed mold conditions so as to produce a final product thickness of less than 3 mm, the inherent high strength and density indicated by these values is obtained. At the same time, the matched die molding technique, when using weight molding composites, excepting for the addition of the ester to the reactive mixture, can be followed, and without increasing materially, if at all, the setting and mold dwell times characteristic of the use of the less desirable coarser and less compacted fiber reinforcement material.

To describe the foregoing in more detail, a specific example of the invention is with the aid of the accompanying drawings described in detail hereinbelow.

DESCRIPTION OF THE DRAWINGS

In the accompanying drawings the various figures are as follows.

DETAILED DESCRIPTION OF THE INVENTION

In this illustrated example, the part being molded is a half of the shell of a suitcase which should be of high density, consequently having high strength, and of attractive external appearance.

The external dimensions are 700×500 mm, the depth is 100 mm, and its exterior is desirably covered by an ABS foil of 0.8 mm thickness, the half shell having an overall wall thickness of 4 mm.

Figure 1:
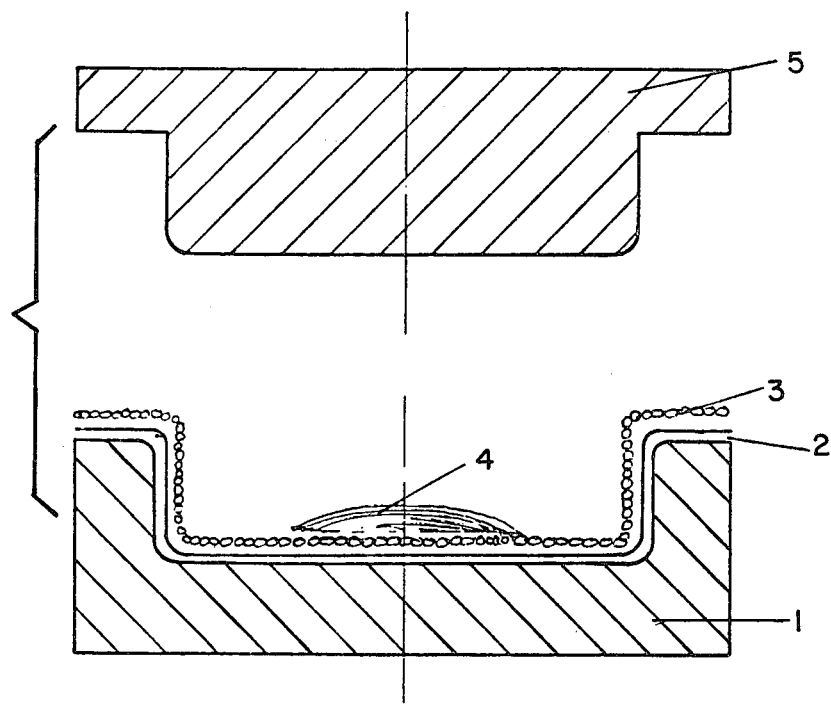
FIG. 1 shows a matched die with its male part raised from its female part and with the latter being set with a fiber reinforcement and the reactive foaming mixture and, in addition, below the reinforcement a preformed resin foil providing both added strength and external appearance improvement.

In FIG. 1 the matched die is open with its female part 1 having the ABS foil in the form of a preform 2 positioned in the die cavity, a fiberglass reinforcement 3 being positioned on top of the foil and the reactive foaming mixture 4 having been poured in the center of the reinforcement and in a quantity calculated so that with foaming the fiber reinforcement fiber interstices should be completely filled, the fibers should be wet by the foaming and ordinarily, of course, the closed mold cavity should be completely filled. The fiberglass reinforcement has a fiber thickness in the area of 20 microns, an area weight of 450 g/m² and an overall thickness of about from 8 to 10 mm, it being understood that at this time the fiber reinforcement is completely undensified. The reinforcement can be fiberglass mat when the molded part is not deeply drawn, and for deep-drawn moldings, the reinforcement may be a preform. In the drawings a preform is illustrated.

The material 4 can be the commercially available rigidfoam system of polyetherpolyol and liquid raw diphenylmethane diisocyanate and might be provided with a catalyst and a propellant. If used only as commercially available, its foaming could flow for only a few centimeters through the fiberglass reinforcement 3 when the mold is closed to provide the 4 mm wall thickness desired for the half-shell of the suitcase.

However, to this commercially available system or mixture is added a mixture of a neutral ester of phthalic acid with butyl alcohol and an epoxy stearate. Other esters can also be used alone or mixed with each other, as long as these are esters with a boiling point above the reaction temperature of the reaction mixture used. Observing this feature is important particularly for the reason that the addition of substances with a low evaporation point would lead to binding the heat released during the chemical reaction of the mixture and, thereby, to an undesirable cooling effect. The result would be incomplete curing.

A further improvement can be obtained if a small amount up to 25% by weight of an epoxy stearate is further added to the reaction mixture, to which the ester has been added. In every case a distinctly noticeable substantial improvement of the flow behavior is obtained, and flow distances of more than 0.5 m through a densified fiber mat are obtained without difficulty. The reaction behavior of the reaction mixture used does not change noticeably through the addition of the ester, and the additional epoxy stearate when applicable. This makes it possible to continue using the customary and known production methods, employing the known metering devices. No difficulties are encountered either if the preformed foil is placed in the opened die and which is pressed against the wall of the die during the propulsion or foaming phase of the reaction mixture, in the process entering into a firm bond with the foam material. The mechanical properties of such a formed part are the result, on the one hand, of the sandwich connection to the foil which cover the surface and may optionally also consist of hard material, and from the position and the mutual anchoring of the fibers arranged inside the foam material. Optimum properties are obtained if, in the interior of the foam material, the fibrous material of very fine, endless fibers is arranged in a direction which is fixed so that the fibers take up the loads to be expected later in an optimum manner.

Strength properties completely independent of direction are obtained through the use of a fibrous material with random fibers, the fiber structure of which shows no preferred direction.

Figure 2:
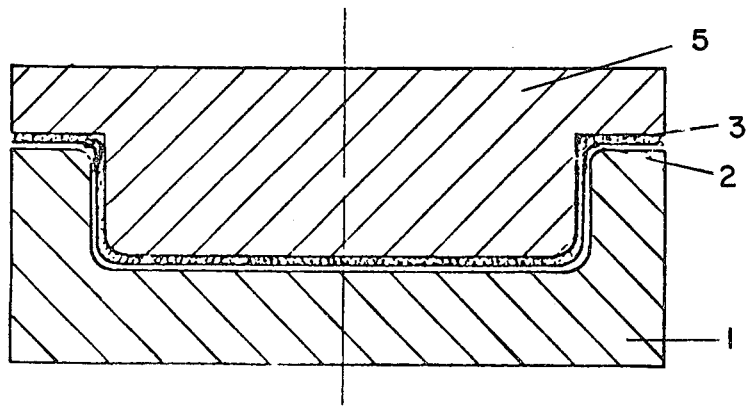
FIG. 2 shows the die closed and with the foaming reaction in progress or possibly completed.

As soon as the reaction material is poured onto the center of the reinforcement 3, the die's male part 5 is lowered so that the die is closed as shown by FIG. 2 with the initially uncompacted fiberglass reinforcement compacted to the ultimately desired thickness of 4 mm. As the chemical foaming reaction proceeds, the foaming flows into and through all or substantially all of the voids formed by the interstices of the glass fibers, thoroughly wetting the fibers and completely filling the mold cavity, the ABS foil being pressed by the internal pressure firmly against the cavity bottom of the female die part which is, of course, contoured and finished to provide the desired final shape and external finish of the half shell.

Figure 3:
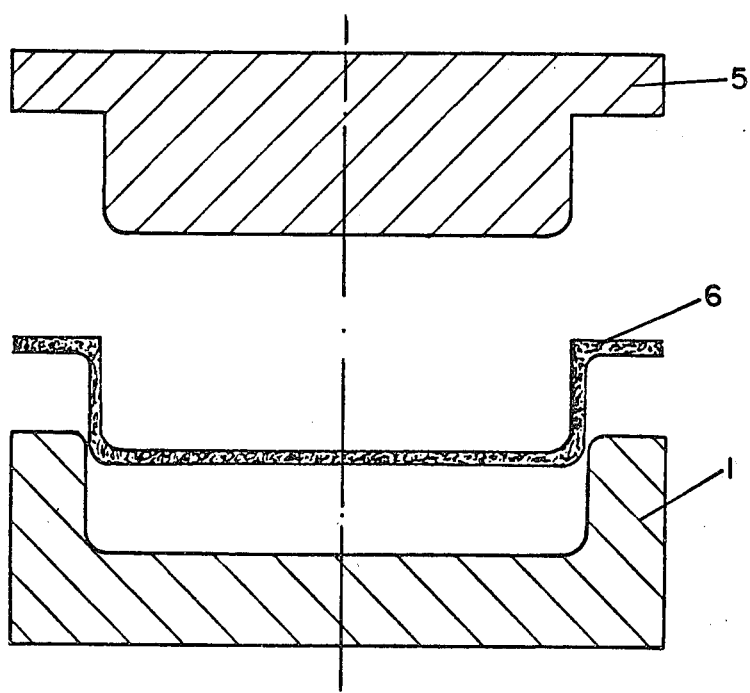
FIG. 3 shows the mold open and the removal of the finished molded pat.

After a curing time of four to five minutes, the chemical reaction is completed, so that the die can be opened and the half shell removed as shown by FIG. 3. This curing or reaction time is the same or substantially the same as would be required by the commercially available rigid foam system unmodified by the present invention and, therefore, incapable of being used with a fiberglass reinforcement of the fiber size and densification described hereinabove.

What is claimed is:

1. Method for matched die molding a fiber reinforced polyurethane foam molded product, comprising positioning a fiber reinforcement in the female part of an open matched die, placing a foaming reaction mixture of polyol and isocyanate on the reinforcement, closing the male part on the reinforcement so as to compact the reinforcement while the mixture continues foaming, and allowing the foaming reaction to complete so as to produce said product, said fiber reinforcement having a thinness and degree of compaction when said male part is closed normally preventing flow completely throughout the reinforcement prior to completion of the foaming reaction; wherein the improvement comprises initially adding to said mixture from 5% to 30% by weight of a neutral ester having a boiling temperature above the reaction temperature of the mixture, and causing the mixture to flow completely throughout said reinforcement prior to completion of the foaming reaction and while said die's male part is closed so as to produce said molded product with a high density and strength throughout.

2. The method of claim 1 in which said ester has a boiling temperature above 200° C.

3. The method of claim 1 in which said ester is an ester of phthalic or stearic acid of butyl, benzyl or octyl alcohol.

4. The method of claim 1 in which in addition to said ester up to 25% by weight of an epoxy stearate is also initially added to said mixture.

* * * * *